United States Patent
Prakash

(10) Patent No.: US 7,050,441 B2
(45) Date of Patent: May 23, 2006

(54) METHOD AND APPARATUS FOR HYBRID COMMUNICATION NETWORK

(75) Inventor: Adityo Prakash, Redwood Shores, CA (US)

(73) Assignee: PTS Corporation, San Jose, CA (US)

(*) Notice: Subject to any disclaimer, the term of this patent is extended or adjusted under 35 U.S.C. 154(b) by 919 days.

(21) Appl. No.: 09/998,014

(22) Filed: Nov. 29, 2001

(65) Prior Publication Data

US 2002/0097727 A1 Jul. 25, 2002

Related U.S. Application Data

(60) Provisional application No. 60/253,961, filed on Nov. 29, 2000.

(51) Int. Cl.
*H04L 12/28* (2006.01)
*H04L 12/56* (2006.01)

(52) U.S. Cl. .................. 370/395.42; 370/468; 370/235

(58) Field of Classification Search ........... 370/395.42, 370/351–356, 229, 230.1, 231, 235, 468
See application file for complete search history.

(56) References Cited

U.S. PATENT DOCUMENTS

| | | | |
|---|---|---|---|
| 5,463,620 A | | 10/1995 | Sriram |
| 5,944,795 A | * | 8/1999 | Civanlar ..................... 709/227 |
| 6,081,291 A | | 6/2000 | Ludwig, Jr. |
| 6,081,843 A | * | 6/2000 | Kilkki et al. ............... 709/232 |
| 6,134,235 A | * | 10/2000 | Goldman et al. ........... 370/352 |
| 6,144,661 A | * | 11/2000 | Katsube et al. ............ 370/390 |
| 6,147,975 A | * | 11/2000 | Bowman-Amuah ........ 370/252 |
| 6,188,670 B1 | * | 2/2001 | Lackman et al. ........... 370/231 |
| 6,363,065 B1 | * | 3/2002 | Thornton et al. ........... 370/352 |
| 6,449,588 B1 | | 9/2002 | Bowman-Amuah |
| 6,671,741 B1 | | 12/2003 | Dillon |
| 6,868,080 B1 | * | 3/2005 | Umansky et al. ........... 370/354 |
| 2002/0080785 A1 | * | 6/2002 | Prakash ..................... 370/389 |

* cited by examiner

*Primary Examiner*—Ajit Patel
*Assistant Examiner*—Chirag Shah
(74) *Attorney, Agent, or Firm*—Okamoto & Benedicto LLP

(57) ABSTRACT

The utilization of an non-QOS guaranteed network is envisioned within a communication network to increase bandwidth when necessary. In this system two locations are connected by two separate communications networks one QOS guaranteed QOS guaranteed network while the other non-QOS guaranteed packet based network without QOS guarantee. A smart buffering system integrates the two networks.

19 Claims, 8 Drawing Sheets

METHOD AND APPARATUS FOR HYBRID COMMUNICATION NETWORK

CROSS-REFERENCES TO RELATED APPLICATIONS

The present disclosure claims priority from U.S. Provisional Patent Application No. 60/253,961, filed Nov. 29, 2000, and entitled "Hybrid Star-Overflow Network," the disclosure of which is hereby incorporated by reference for all purposes.

FIELD OF THE INVENTION

The present invention relates to broadband content distribution networks utilizing Asynchronous Transfer Mode (ATM) or Internet Protocol (IP) or Wireless protocol backbone transport and a system of coordinated servers, storage devices, caching devices and a content stream manager.

BACKGROUND OF THE INVENTION

The present invention relates to electronic communication systems. More specifically, the present invention relates to a communication network system that utilizes additional network connections when necessary to increase bandwidth.

Many networks exist to carry data having various bandwidth requirements. One such network is a global internetwork of networks known as the "Internet". In the early days of networking, data was usually in the form of text and small data sets. The transfer of large, megabyte data sets was known, but typically such large data sets were few and far between and their recipient was content with receiving the data set over a long period of time if the network bandwidth was such that the transmission would take a long period of time.

In the current environment, with the explosion in popularity of networking for entertainment, commerce and other new uses (as well as the old uses), many users expect to get large bandwidth data sets and they expect to get it in real-time, or near real-time.

Data transmission may be guaranteed for Quality of Service (QOS). One way to be able to guarantee QOS is to lease an entire line connecting two locations or lease a certain amount of bandwidth of a line. This in effect guarantees that the bandwidth in a leased line or the amount of leased bandwidth will be available for transmission at all times enabling the user to guarantee a certain average data transmission rate and guarantee QOS. Other ways of putting priority include the, so called, 'diff serve' capability where each packet in the network is given a priority of transmission. This process however does not guarantee transmission on time, only that the higher priority data packets will reach their destinations faster than the lower priority packets.

Sometimes sustained data rates higher than what the QOS-guaranteed connection can support is needed. Often non-QOS guaranteed connections exist between a transmitting and a receiving center that can be used in conjunction with the QOS guaranteed network connection according to the current invention to increase sustained data rates.

SUMMARY OF THE INVENTION

In one embodiment of a communication network system according to the present invention, a non-QOS guaranteed network is utilized when necessary to increase bandwidth. The best mode of the present invention provides a communication network system, comprising: one or more transmitting locations able to store and serve data to one or more receiving centers located as near as possible to a plurality of final destination where this data will be ultimately received. Two data network connections, one QOS guaranteed QOS guaranteed and one non-QOS guaranteed packet based network connection, connect the regional and the receiving centers. A stream manager manages and distributes load on the data networks and monitors buffer depths at both the transmitting location and the receiving center. When additional bandwidth is needed for data transfer, the non-QOS guaranteed network is utilized, in addition to the QOS guaranteed network. In one embodiment, the stream manager redirects the lower priority traffic to the non QOS guaranteed packet based network while transferring the higher priority traffic through the QOS guaranteed network. The buffering system at the receiving center is able to hold the data until all of the parts necessary for reconstructing the data are received through both available networks. The buffer can subsequently reconstruct the data.

DESCRIPTION OF THE SPECIFIC EMBODIMENTS

Figure 1A:
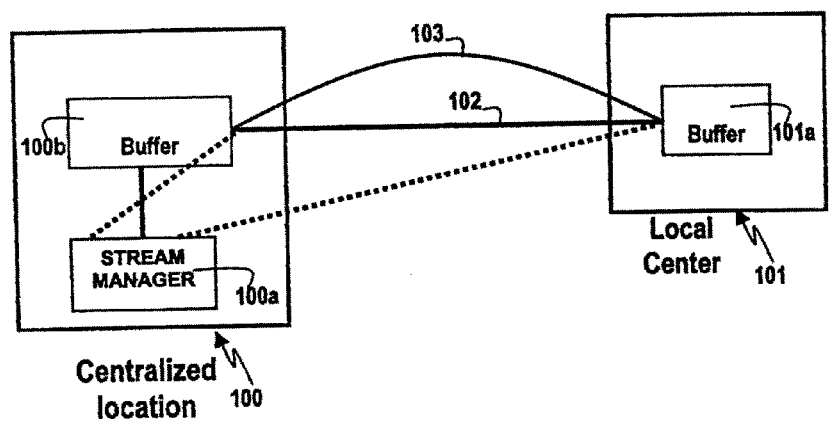
FIG. 1A illustrates the basic architecture of the network

As shown in the exemplary drawings wherein like reference numerals indicate like or corresponding elements among the figures, the present invention includes a communication network system. The system utilizes a hybrid network transmission method when necessary to increase bandwidth.

As mentioned previously, communication systems exhibit limited bandwidth capability. Consequently, it would be desirable to provide a communication network system with increased bandwidth capabilities.

FIG. 1A illustrates the basic structure of a hybrid network designed to increase available bandwidth whenever necessary. The system includes a QOS guaranteed network 102 between a transmitting location 100 and a receiving center 101, which receives data streams from the transmitting location. The two locations 100 and 101 are also connected through a separate non-QOS guaranteed packet based network 103. Although a single direct network 103 is shown for the purposes of illustration, the non-QOS guaranteed network may be a part of a large network with multiple nodes. Similarly, the QOS guaranteed connection may not be a direct network. Instead the QOS guaranteed network may also be a part of a network where a portion of the bandwidth is leased instead of the entire network.

Figure 1B:
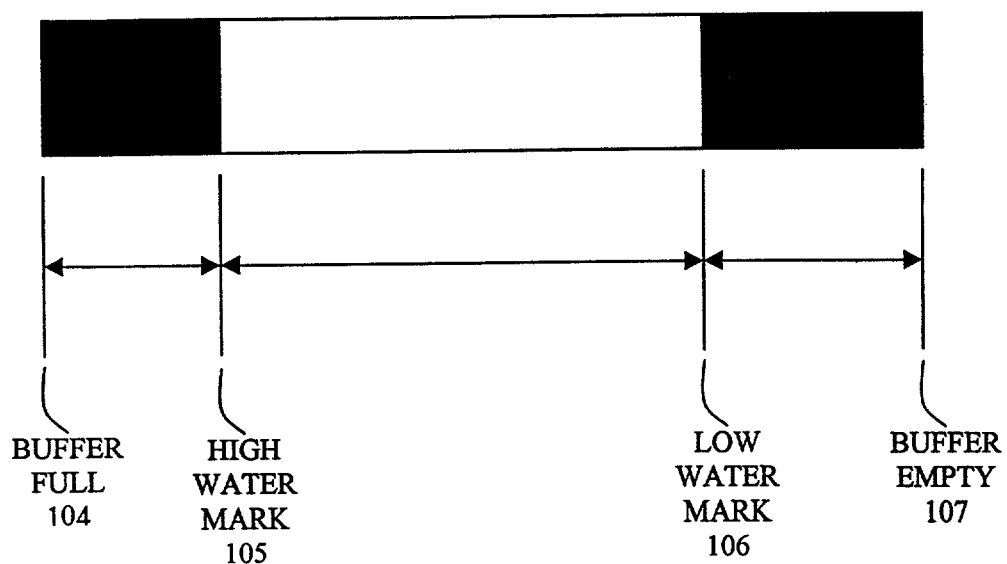
FIG. 1B illustrates an exemplary buffer depth and watermarks

Data is coming into the transmitting location and being served from it at variable rates. Load on the two data networks connecting the transmitting location and the receiving location is managed by a stream manager 100a. The stream manager is responsible for network connection traffic to the QOS guaranteed and the non-QOS guaranteed networks by monitoring buffer level at the transmitting location 100 and the receiving data center 101 either individually or in tandem. An exemplary buffer depth is shown in FIG. 1B which shows a buffer full level 104, a high watermark 105 which is a high threshold level, a low water mark 106 which is a low threshold level and a buffer empty level 107. In one embodiment of the present invention, when the buffer 101*a* at the receiving center is below a certain low watermark, the stream manager utilizes the non-QOS guaranteed network to transfer data to the receiving center in addition to the QOS guaranteed network until the buffer is filled above a high watermark. Similarly, when the buffer 100*b* at the transmitting location is above a high watermark, the stream manager utilizes the non-QOS guaranteed network to transfer data to the receiving center in addition to using the QOS guaranteed network. The stream manager utilizes the non-QOS guaranteed link in situations where the receiving center buffer needs to be filled or the transmitting center buffer needs to be drained in a time critical manner. The buffer at the receiving center as well the transmitting location is able to hold the data packets until all of the packets necessary for reconstructing the data is received. The buffer is then able to reconstruct the data.

In one embodiment of the present invention, the stream manager balances load on the two networks by prioritizing different types of traffic and redirecting traffic through the different network connections based upon priority. In another embodiment however, even high priority traffic is sent through the non-QOS guaranteed network. In the current embodiment the non-QOS guaranteed network is an IP based network. However in other embodiments both networks may be utilize other network transmission protocols. Regardless of the specific network or the network protocol utilized, the basic architecture involves having two transmission networks one QOS guaranteed and QOS guaranteed network while the other non-QOS guaranteed network which may or may not have QOS guarantee.

Figure 1C:
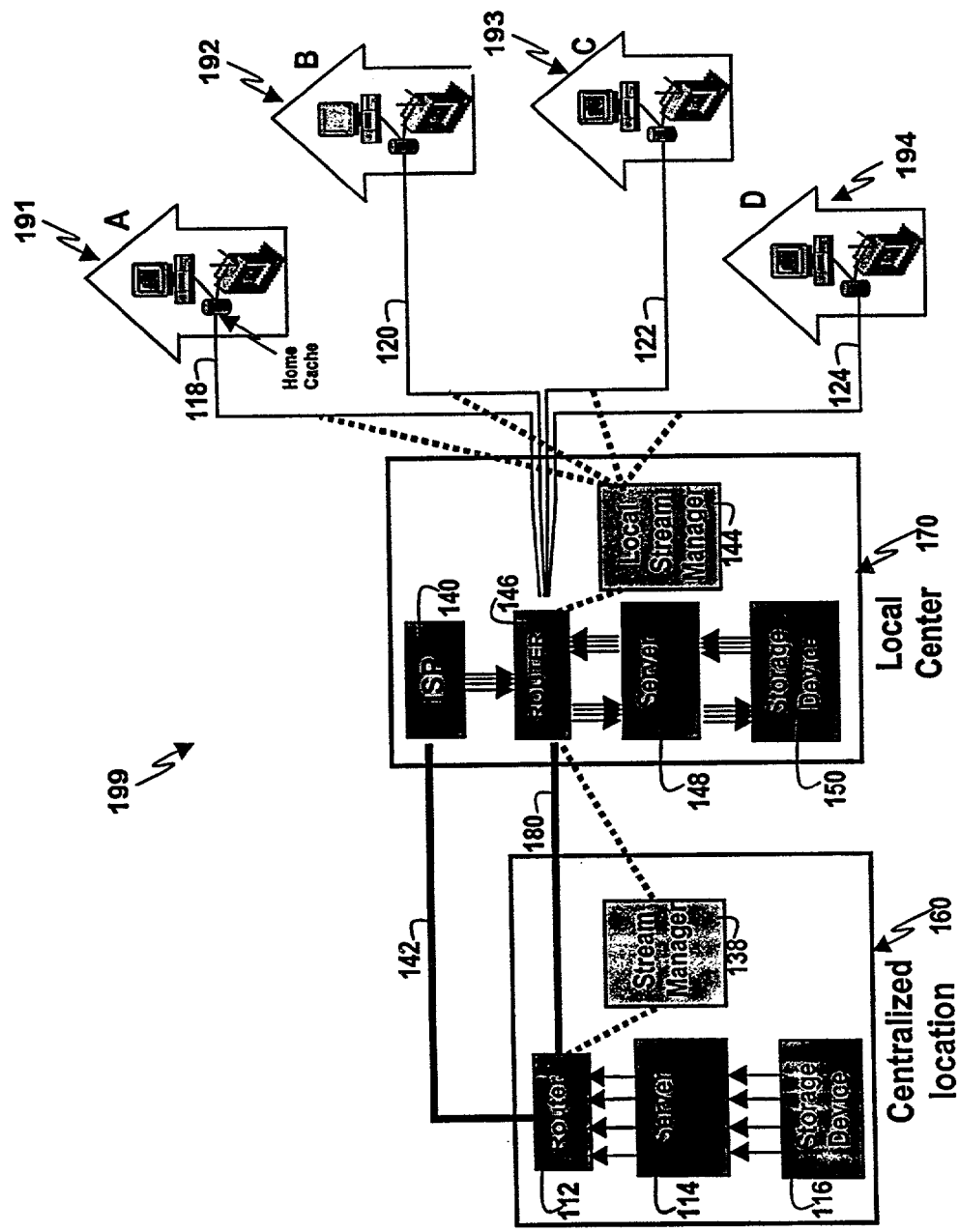
FIG. 1C illustrates the network in the best mode

Referring now to FIG. 1C, an exemplary communication network system 199 in accordance with the present invention is illustrated. The system includes a transmitting location 160 connected to a receiving center 170 located closer to the end user final destination. The receiving center is connected to the transmitting location via a set of main data lines 180, which is a private packet-based network connection utilizing mostly RTP or UDP transfer protocols able to provide QOS guaranteed data transmission.

In addition to the main data lines, the receiving center will be coupled to an internet service provider (ISP) 140 networking the receiving center to the transmitting location through an IP based network 142 distinct from the main data network 180. The connection 142 is the embodiment of the non-QOS guaranteed connection. The said IP based data line will connect the ISP 140 to the router 112 at the transmitting location. The ISP 140 is also connected to the router 146 at the receiving center. Four final destination, 191, 192, 193 and 194, are shown for purposes of illustration; however, more or fewer final destination may be a part of the present system. Although an IP based network is envisioned in the current embodiment, in other embodiments the non-QOS guaranteed data network may a different type of communications network such a wireless network. In a third embodiment the non-QOS guaranteed network may be a digital cable network.

The transmitting location houses equipments necessary for transmission of real time and stored data. This equipment can include a router 112, a server 114, and a storage device 116 and a stream manager 138. The server 114 may contain the buffer where data is temporarily held which is the embodiment of the transmitting location buffer. Although a single router, server and storage device is shown for the purposes of illustration, a plurality of said routers, servers and storage devices may be a part of the present system. Although in the best mode of the present invention, it is envisioned that the main transmission networks will be private packet based networks such as DSL, in another embodiment of the invention, the transmitting location may be a cable head end. In yet another embodiment the transmitting location may be a satellite transmission center. In each of the above embodiments the specific equipment housed at the transmitting location may differ. However the principle of utilization of a non-QOS guaranteed network will remain valid.

The receiving center 170 will house a set of equipments for storage and transmission, which may include one or more of each of a router 146, server 148, and a storage device 150. The server 148 contains a buffer where data is temporarily held. In addition, the receiving center contains a receiving stream manager 144. The capabilities of the receiving stream manager include but are not limited to:

1) Detection of the buffer level at the receiving center data server.

2) Support data priorities.

3) The ability to send request to the transmitting stream manager to increase data rate by utilizing 103.

4) The ability to send request to the transmitting stream manager to prioritize specific data.

The capabilities of the stream manager 138 located at the transmitting location include but are not limited to:

5) Detection of the buffer level at the regional center data server.

6) Increasing data rate utilizing 103 when the buffer is at the high water mark.

7) The ability to respond to 3 above.

8) The ability to respond to 4 above.

9) Ability to keep track of buffer level at the receiving center.

10) Support data priorities.

11) The ability to prioritize the delivery of content located at the transmitting location.

12) The ability to redirect lower priority content to the non-QOS guaranteed network connection 103.

13) The ability to stop redirecting traffic to 103 when need for higher data rate has dropped based on buffer levels at both transmitting and receiving locations.

Figure 2A:
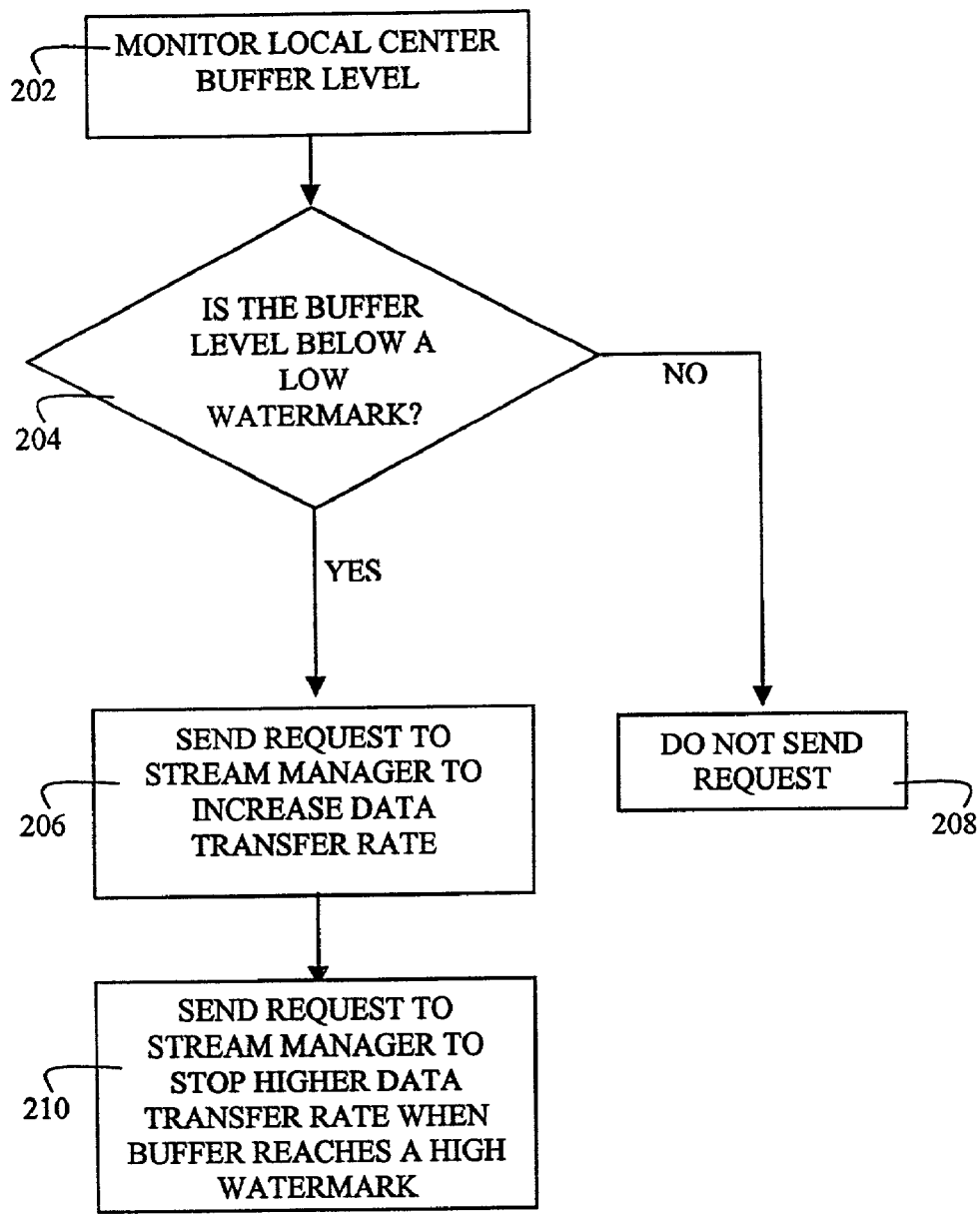
FIGS. 2A–B illustrate the function of the receiving stream manager
Figure 2B:
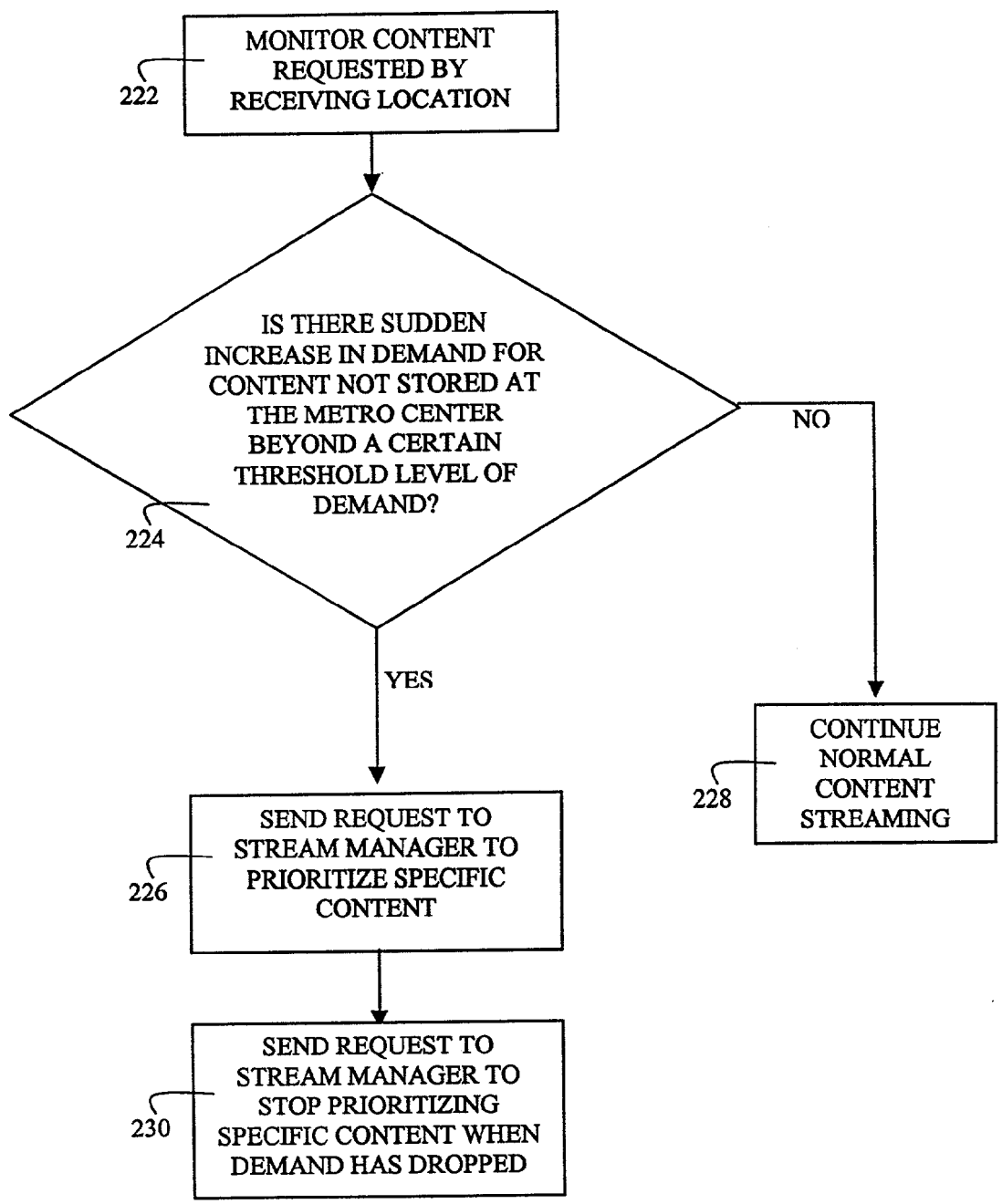

FIGS. 2A and 2B illustrate the role of the receiving stream manager 144 in the method of utilizing the non-QOS guaranteed data lines in the exemplary system. As shown in the FIG. 2A, the receiving stream manager monitors the buffer level at the receiving center (202). If the buffer level falls below a preset watermark (204), the receiving stream manager sends request to the stream manager to increase the data transmission rate (206) otherwise no request is sent (208). When the buffer level is above a high watermark, the receiving stream manager sends request to the stream manager at the receiving center to resume normal rate of data transmission (210).

As illustrated in FIG. 2B, in another embodiment, the receiving stream manager continuously monitors the contents requested by individual viewing locations (222). As illustrated in steps 224 and 226, if demand for certain contents suddenly increases and this content is not stored at the receiving center storage device 150, the receiving stream manager 144 sends a request to the stream manager 138 coupled to the transmitting location to prioritize the streaming of that content in order to continue uninterrupted streaming to the final destination. Otherwise normal content streaming continues through the main data lines (228). When the demand for the content has dropped, the receiving stream manager sends request to the stream manager at the transmitting location to stop prioritized delivery of the previously requested content (230).

Figure 3A:
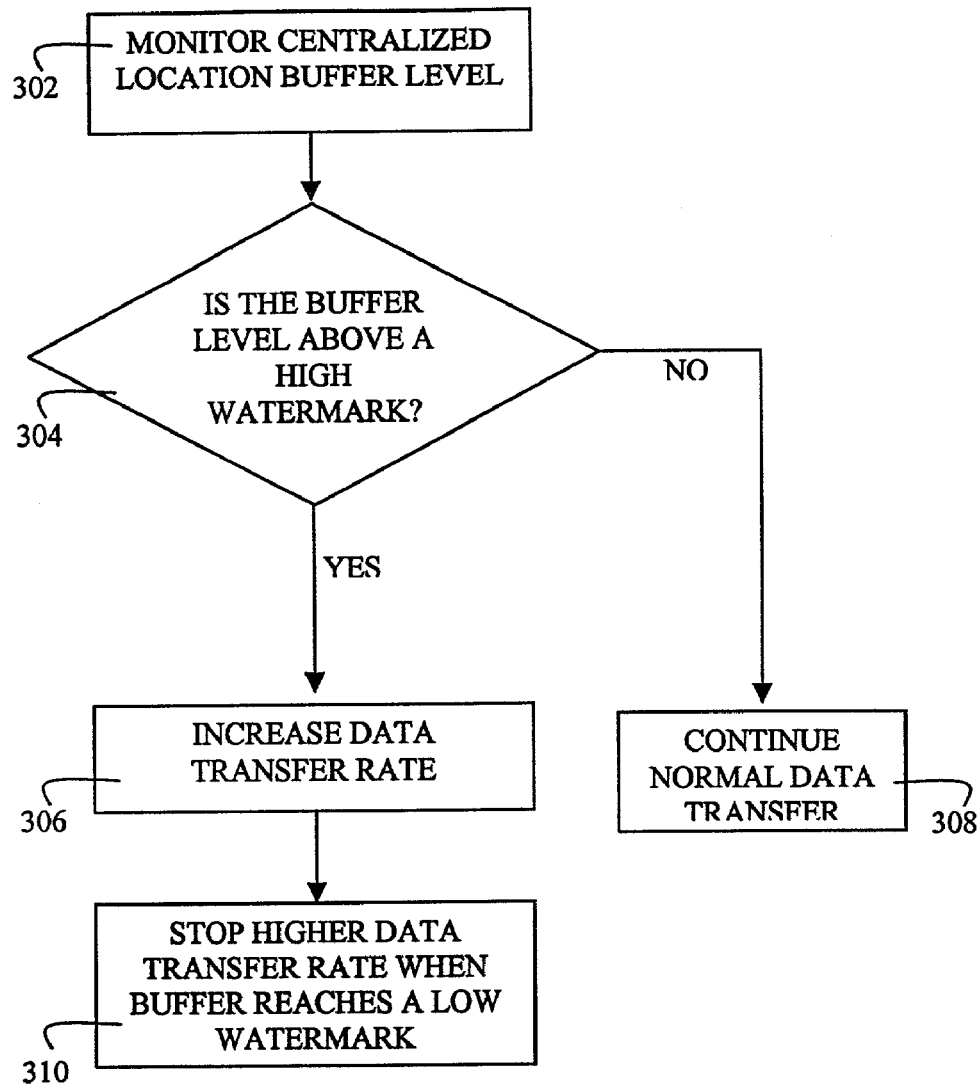
FIGS. 3A–C illustrate the function of the stream manager at the transmitting location
Figure 3B:
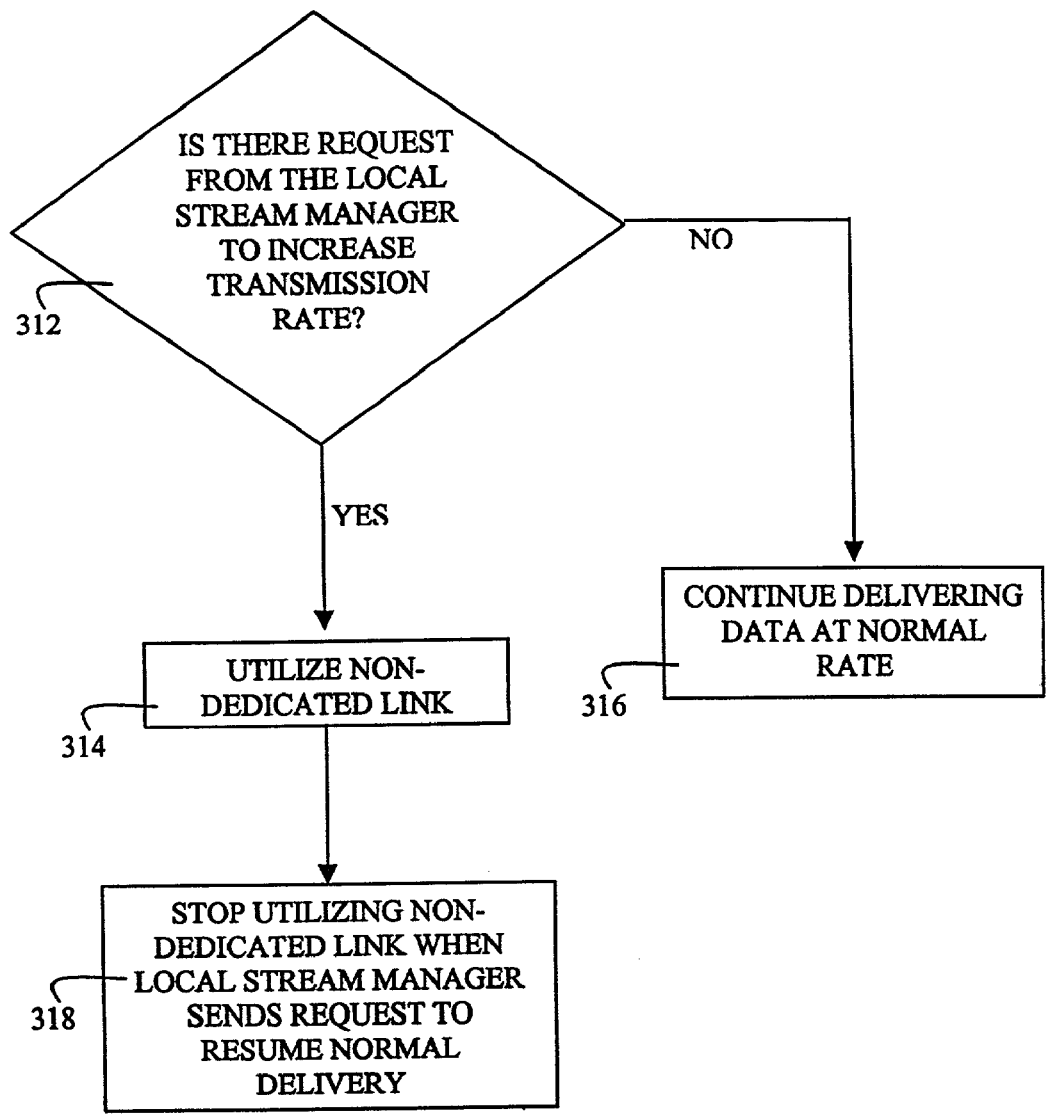
Figure 3C:
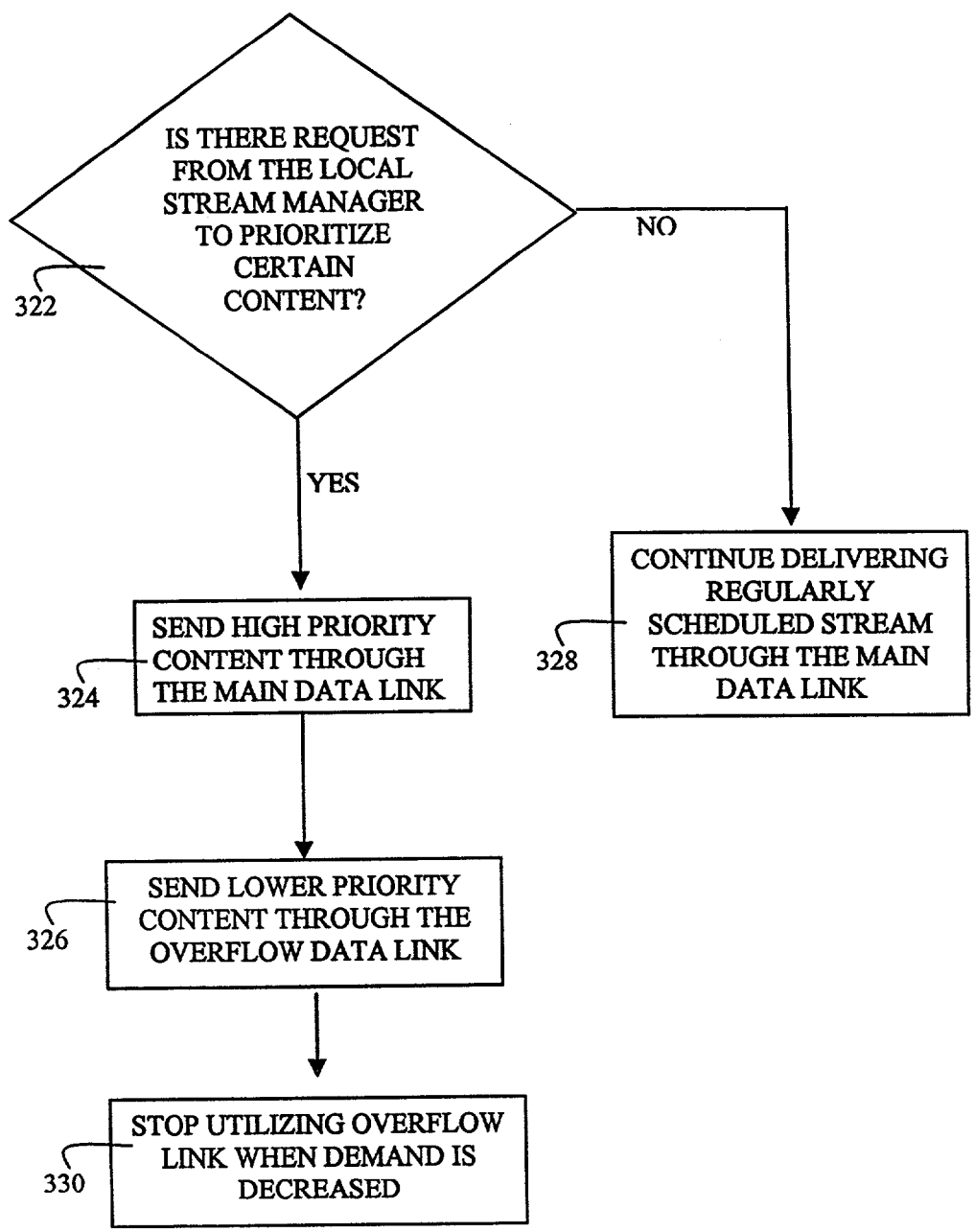

FIGS. 3A, 3B and 3C illustrate the function of the stream manager 138 at the transmitting location in the method of utilizing the non-QOS guaranteed data lines. As illustrated in FIG. 3A, the stream manager monitors the buffer level at the transmitting location (302). When the buffer level reaches a high watermark beyond which packets may be lost (304), the stream manager increases the data rate to the receiving center by utilizing the non-QOS guaranteed network (306) until the buffer level at the transmitting location falls below a low watermark (310). If the buffer level is within normal range the stream manager continues normal data delivery through the QOS guaranteed network.

The stream manager also increases data transmission rate when requested to do so by the receiving stream manager. As illustrated in steps 312 and 314 of FIG. 3B, if the stream manager receives a request from the receiving stream manager to increase data transmission rate, it utilizes the non-QOS guaranteed network to increase bandwidth until the receiving stream manager sends request to resume normal rates of data transmission (318).

In another embodiment, upon receiving request from the receiving stream manager, the stream manager 138 prioritizes the transfer of the content requested by the receiving stream manager through the main data lines 180 (322, 324). However this prevents the transfer of relatively lower priority contents through the same data network since most or all of the bandwidth is being utilized to transfer the high priority content. In order to prevent interruption in transmission of the relatively lower priority content from the transmitting location to the receiving center, the stream manager at the transmitting location redirects the said lower priority content to the non-QOS guaranteed network (326). Once the stream manager receives request from the receiving stream manager to stop prioritizing delivery of data it previously requested, the stream manager resumes normal data streaming which may or may not include utilizing the non-QOS guaranteed network (330). In the present embodiment the stream manager continues normal data streaming if no request in received from the receiving stream manager (328). In certain conditions it is envisioned that the stream manager at the transmitting location may also redirect high priority content to the non-QOS guaranteed network if all of the high priority content cannot be sent through the main data network 180. In another embodiment, the stream manager at the transmitting location may begin utilizing the non-QOS guaranteed network without any request from the receiving center. In this case the decision to utilize the non-QOS guaranteed network is made by the stream manager 138 based upon the bandwidth necessary to transfer data and is independent of the presence or the absence of any request made by the receiving stream manager.

The above description is illustrative and not restrictive. The scope of the invention should, therefore, be determined not with reference to the above description, but instead should be determined with reference to the appended claims along with their full scope of equivalents.

What is claimed is:

1. A communication network system, comprising:
    a content server coupled with a transmitting location;
    a content server coupled with a receiving center;
    a QOS guaranteed data network connecting the transmitting location and the receiving center;
    a non-QOS guaranteed data network connecting the transmitting location and the receiving center;
    a buffer coupled with the transmitting location;
    a buffer coupled with the receiving center;
    a transmitting stream manager for routing traffic to either the QOS guaranteed or non-QOS guaranteed data networks; and
    a receiving stream manager for detecting demand at the receiving center,
    wherein the transmitting stream manager is configured to increase a data transmission rate by utilizing the non-QOS guaranteed data network when a fill level of the buffer at the transmitting location is above a threshold.

2. The communication network system of claim 1 where the QOS guaranteed data network is any packet based network.

3. The communication network system of claim 1 where the QOS guaranteed data network is a digital cable network between the transmitting location and the receiving location.

4. The communication network system of claim 1 where the non-QOS guaranteed data network is an Internet Protocol (IP) based network.

5. The communication network system of claim 1 where the non-QOS guaranteed data network is any packet based network.

6. The communication network system of claim 1 where the non-QOS guaranteed data network is any communication network between the transmitting location and the receiving location.

7. The communication network system of claim 1, where the buffer at the receiving center is configured to hold data until all of the packets necessary to reconstruct the data is received.

8. The communication network system of claim 7, where the buffer at the receiving center is configured to reconstruct the data.

9. The communication network system of claim 1, wherein the receiving stream manager is configured to detect a fill level of the buffer at the receiving center.

10. The communication network system of claim 9, wherein the receiving stream manager is configured to send a request to the stream manager at the transmitting location to increase the data transmission rate when the fill level of the buffer at the receiving center is below a threshold.

11. The communication network system of claim 1, wherein the receiving stream manager is configured to send a request to the stream manager at the transmitting location to give higher priority to specific data.

12. The communication network system of claim 11, wherein the receiving stream manager is configured to send a request to the transmitting stream manager to stop giving higher priority to the specific data.

13. The communication network system of claim 1, wherein the transmitting stream manager is configured to detect the fill level of the buffer at the transmitting location.

14. The communication network system of claim 1, wherein the transmitting stream manager is further configured to receive the request from the receiving stream manager to give higher priority to specific data.

15. The communication network system of claim 14, wherein the transmitting stream manager is further configured to redirect the specific data to the non-QOS guaranteed network.

16. The communication network system of claim 15, wherein the transmitting stream manager is further configured to resume normal delivery of the specific data to the receiving center upon receiving a request from the receiving stream manager to stop giving the higher priority to the specific data.

17. A method of communicating data packets from a content server, the method comprising:
   buffering the data packets from the content server by using a buffer at a transmitting location;
   determination by a transmitting stream manager whether the data packets are to be routed from the transmitting location to the receiving location via either a quality-of-service guaranteed data network or a non-quality-of-service guaranteed data network; and
   increasing a data transmission rate by the transmitting stream manager determining to utilize the non-quality-of-service guaranteed data network when a fill level of the buffer at the transmitting location is above a pre-determined threshold level.

18. A method of communicating data packets between two content servers, the method comprising:
   buffering the data packets from a first content server by using a buffer at a transmitting location;
   buffering the data packets to a second content server by using a buffer at a receiving location;
   determination by a transmitting stream manager whether the data packets are to be routed from the transmitting location to the receiving location via either a quality-of-service guaranteed data network or a non-quality-of-service guaranteed data network; and
   increasing a data transmission rate by the transmitting stream manager determining to utilize the non-quality-of-service guaranteed data network when a fill level of the buffer at the transmitting location is above a pre-determined threshold level.

19. The method of claim 18, further comprising the transmitting stream manager giving higher priority to specific content after receiving a request from the receiving stream manager to give the higher priority to the specific content.

* * * * *